US012656184B2

(12) United States Patent
Sin

(10) Patent No.: US 12,656,184 B2
(45) Date of Patent: Jun. 16, 2026

(54) MULTICHANNEL THERMOCOUPLE MEASUREMENT DEVICE

(71) Applicant: LS ELECTRIC CO., LTD., Anyang-si (KR)

(72) Inventor: Yong Gak Sin, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 470 days.

(21) Appl. No.: 18/039,464

(22) PCT Filed: Nov. 24, 2021

(86) PCT No.: PCT/KR2021/017360
§ 371 (c)(1),
(2) Date: Nov. 30, 2023

(87) PCT Pub. No.: WO2022/114762
PCT Pub. Date: Jun. 2, 2022

(65) Prior Publication Data
US 2024/0118143 A1      Apr. 11, 2024

(30) Foreign Application Priority Data

Nov. 30, 2020      (KR) ........................ 10-2020-0164242

(51) Int. Cl.
*G01K 7/13* (2006.01)
*G01K 1/02* (2021.01)
*G01K 7/22* (2006.01)
(52) U.S. Cl.
CPC .............. *G01K 7/13* (2013.01); *G01K 1/026* (2013.01); *G01K 7/22* (2013.01); *G01K 2219/00* (2013.01)

(58) Field of Classification Search
CPC ........... G01K 7/13; G01K 1/026; G01K 7/22; G01K 2219/00
USPC ................................. 374/181, 179, 170, 142
See application file for complete search history.

(56) References Cited

U.S. PATENT DOCUMENTS

| | | | | |
|---|---|---|---|---|
| 3,956,686 A | 5/1976 | Tanaka | | |
| 5,090,918 A | 2/1992 | Zoellick et al. | | |
| 2011/0243188 A1* | 10/2011 | Aberra | ..................... | G01K 7/14 374/E7.015 |
| 2012/0197586 A1* | 8/2012 | Zhang | ..................... | G01K 7/12 702/133 |
| 2014/0379290 A1 | 12/2014 | Wlodarczyk et al. | | |

(Continued)

FOREIGN PATENT DOCUMENTS

| | | | |
|---|---|---|---|
| CN | 201130066 Y | * | 10/2008 |
| CN | 105628236 A | | 6/2016 |

(Continued)

OTHER PUBLICATIONS

Translation of JP2003177065A.*

(Continued)

*Primary Examiner* — Mirellys Jagan
(74) *Attorney, Agent, or Firm* — K&L Gates LLP

(57) ABSTRACT

The present disclosure relates to a multichannel thermo-couple measurement device, which may comprise: a ther-mocouple-thermistor pair; a terminal to which an analog signal of the thermocouple-thermistor pair is input; and a detection unit which converts the analog signal of the thermocouple-thermistor pair, input via the terminal, into a digital signal.

1 Claim, 4 Drawing Sheets

(56) References Cited

U.S. PATENT DOCUMENTS

| | | | | |
|---|---|---|---|---|
| 2016/0041566 | A1 | | 2/2016 | Sin |
| 2016/0377489 | A1* | | 12/2016 | Sin ........................... G01K 7/13 |
| | | | | 374/181 |

FOREIGN PATENT DOCUMENTS

| | | | | | |
|---|---|---|---|---|---|
| CN | 106289559 | A | | 1/2017 | |
| CN | 207675327 | U | | 7/2018 | |
| CN | 111207849 | A | | 5/2020 | |
| JP | 59065399 | A | * | 4/1984 | |
| JP | H102807 | A | | 1/1998 | |
| JP | 2001124636 | A | | 5/2001 | |
| JP | 2003177065 | A | | 6/2003 | |
| JP | 2004150836 | A | | 5/2004 | |
| JP | 2010244751 | A | | 10/2010 | |
| JP | 2013140019 | A | | 7/2013 | |
| JP | 2016003937 | A | | 1/2016 | |
| JP | 2017203745 | A | | 11/2017 | |
| JP | 2018112502 | A | | 7/2018 | |
| JP | 20200159889 | A | | 10/2020 | |
| KR | 100942130 | B1 | * | 2/2010 | |
| KR | 101249463 | B1 | | 3/2013 | |
| KR | 101704222 | B1 | | 2/2017 | |
| WO | 2010003519 | A1 | | 1/2010 | |
| WO | WO-2015104868 | A1 | * | 7/2015 | ............. H01C 7/008 |

OTHER PUBLICATIONS

Translation of WO2015104868A1.*
Search Report for related Chinese Application No. 202180080024. 0; report dated Aug. 20, 2025; (2 pages).
Office Action for related Chinese Application No. 202180080024.0; report dated Aug. 20, 2025; (2 pages).
Office Action for related Japanese Application No. 2023-525985; action dated Apr. 16, 2024; (5 pages).
Extended European Search Report for related European Application No. 21898588.5; action dated Sep. 24, 2024; (7 pages).
International Search Report for related International Application No. PCT/KR2021/017360; action dated Jun. 2, 2022; (5 pages).
Written Opinion for related International Application No. PCT/KR2021/017360; action dated Jun. 2, 2022; (4 pages).
Office Action for related Chinese Application No. 20180080024.0; action dated Mar. 2, 2026; (7 pages).

* cited by examiner

MULTICHANNEL THERMOCOUPLE MEASUREMENT DEVICE

CROSS-REFERENCE TO RELATED APPLICATION

This application is a National Stage of International Application No. PCT/KR2021/017360, filed on Nov. 24, 2021, which claims priority to and the benefit of Korean Patent Application No. 10-2020-0164242, filed on Nov. 30, 2020, the disclosure of which is incorporated herein by reference in its entirety.

FIELD

The present disclosure relates to a multichannel thermocouple measurement device, and more specifically to a multichannel thermocouple measurement device for performing cold junction compensation.

BACKGROUND

In general, the thermocouple is a device for measuring a wide temperature range by using the Seebeck effect, and it is mainly used in extreme environments such as power plants, steel mills and the like because of its excellent durability.

The thermocouple measurement device is a device that measures the temperature by using the electromotive force generated by the thermocouple, and since the measured temperature herein is a value measured based on 0° C., the actual thermocouple sensor measures the temperature near the connection to the measurement device to perform compensation in addition to the value obtained, and this compensation is called the reference junction compensation or cold junction compensation.

An example of a conventional thermocouple measurement device will be described with reference to the accompanying drawings.

FIG. 1 is a block diagram of a conventional thermocouple measurement device.

Referring to FIG. 1, the conventional thermocouple measurement device includes a plurality of thermocouples 100, a resistance thermometer 200 for forming a channel different from the plurality of thermocouples 100 and detecting the temperature of a junction 310, a detection unit 300 for detecting an electromotive force which is generated in each of the plurality of thermocouples 100 and converting the same into a digital signal, and a compensation unit 400 for adding the temperature detected by the resistance thermometer 200 to the temperature detected in the thermocouple 100 detected by the detection unit 300 and providing the result to a PLC 500 or the like.

The detection unit 300 has a multichannel structure and includes an analog-to-digital converter 320 for converting a plurality of junctions 310 to which the thermocouples 100 and the resistance thermometer 200 are respectively connected and resistance values detected through the junctions 310 into digital signals, and an insulation unit 330 for insulating the output of the analog-to-digital converter 320 and providing the same to the compensation unit 400.

The insulation unit 330 may use a photo coupler.

The drawings illustrate 4 channels of the detection unit 300. That is, each of the four thermocouples 100 is packaged in a housing and independently connected, and one thermocouple 100 has both ends connected to two junctions 310, respectively.

The distance between the thermocouple 100 and the junction 310 and the distance between the junction 310 and the analog-to-digital converter 320 may be variously changed according to the installation environment and the like.

The detection unit 300 provides a separate reference junction 311 to which the thermocouple 100 is not connected by using the resistance thermometer 200 for cold junction compensation of the thermocouple 100, and the temperature of the reference junction 311 is detected such that the compensation unit 400 can perform cold junction compensation of the thermocouple 100.

The resistance thermometer 200 uses a conventional thermistor.

The compensation unit 400 may include a control unit 420 for performing cold junction compensation, a memory 410 for storing data, and an interface 430 for communicating with an external device such as a PCL 500 which uses the detected temperature.

However, in the multichannel thermocouple measurement device, since the resistance thermometer 200 for cold junction compensation is located inside the detection unit 300, it is affected by the heat generation state of the detection unit as time elapses after initial startup.

Therefore, the conventional thermocouple measurement device usually has a preheating time of 30 minutes or more until the internal temperature of the detection unit 300 reaches a thermal equilibrium state, and the cold junction compensation error of the thermocouple 100 can be reduced through this preheating time.

Further, in the related art, instead of measuring the temperature of the junction 310 connected to each thermocouple 100, a reference junction 311 is set, the temperature of the reference junction 311 is detected, and the temperature of another junction 310 is predicted to perform cold junction compensation, and thus, accurate compensation may not be performed according to the temperature difference between the reference junction 311 and the junction 310.

In consideration of such a problem, Korean Registered Patent No. 10-0942139 (TEMPERATURE MEASURING APPARATUS USING THERMOCOUPLE SENSOR, registered on Feb. 4, 2010) by the Applicant of the present disclosure describes a temperature measuring apparatus that can measure the temperature of each junction (terminal) to which the thermocouple is connected, respectively.

However, in the above registered patent, since the temperature must be detected by using a digital temperature sensor, the manufacturing cost is relatively increased, and since it is necessary to develop and manufacture a new type of appropriate terminal for each channel, increases in the material cost and processing cost are inevitable.

SUMMARY

An object of the present disclosure to be solved in consideration of the above problems is to provide a multichannel thermocouple measurement device which is capable of reducing the occurrence of a cold junction compensation error due to a deviation of an internal temperature.

In addition, another object of the present disclosure is to provide a multichannel thermocouple measurement device which is capable of detecting the temperature of a junction to which a thermocouple is connected without using a digital temperature sensor.

In addition, still another object of the present disclosure is to provide a multichannel thermocouple measurement device which simplifies the terminal structure and enables cold junction compensation regardless of the equilibrium state of the internal temperature of the measurement device.

Moreover, still another object of the present disclosure is to provide a multichannel thermocouple measurement device which detects the temperature of a junction using a thermistor, and facilitates the replacement and maintenance of a thermistor.

The multichannel thermocouple measurement device for solving the technical problems as described above may include a thermocouple-thermistor pair, a terminal to which an analog signal of the thermocouple-thermistor pair is input, and a detection unit which includes a multichannel analog-to-digital converter and converts the analog signal of the thermocouple-thermistor pair, which is input via the terminal, into a digital signal in the multichannel analog-to-digital converter.

In an exemplary embodiment of the present disclosure, the multichannel thermocouple measurement device may further include a compensation unit for performing cold junction compensation by receiving the digital signal of the detection unit.

In an exemplary embodiment of the present disclosure, the detection unit may be provided in plurality, and a plurality of the detection units may be separately housed.

In an exemplary embodiment of the present disclosure, the terminal may be located in the detection unit.

In an exemplary embodiment of the present disclosure, the terminal may be an external terminal which is located between the detection unit and the thermocouple.

In an exemplary embodiment of the present disclosure, the thermistor may include a PCB board on which a thermistor chip is mounted, a pair of U-shaped terminals which protrude from the PCB board, and a printed wiring which electrically connects each U-shaped terminal and the thermistor chip.

According to the present disclosure, it is possible to prevent the occurrence of an error in cold junction compensation by detecting the junction temperature of each thermocouple.

In addition, since a multichannel analog-to-digital converter is used, it is possible to convert the electromotive forces of a thermocouple and a thermistor that detects the junction temperature of the thermocouple into digital signals by using one analog-to-digital converter, and thus, the temperature of a thermocouple junction can be detected without using a relatively expensive digital temperature sensor. Therefore, it is possible to reduce the cost, and since there is no need to design and manufacture a separate terminal, it has the effect of reducing the cost.

Moreover, the present disclosure has the effect that by moving the position of a junction, which is a compensation reference point, to the outside of the measurement device, the occurrence of errors due to the temperature deviation inside the device is prevented, and the temperature can be detected and compensated immediately without a separate preheating time.

In addition, the present disclosure detects the temperature of a junction by using a thermistor, and has the effect of facilitating the replacement, movement and maintenance of a thermistor by proposing a new coupling structure between a thermistor and a terminal.

Figure 1:
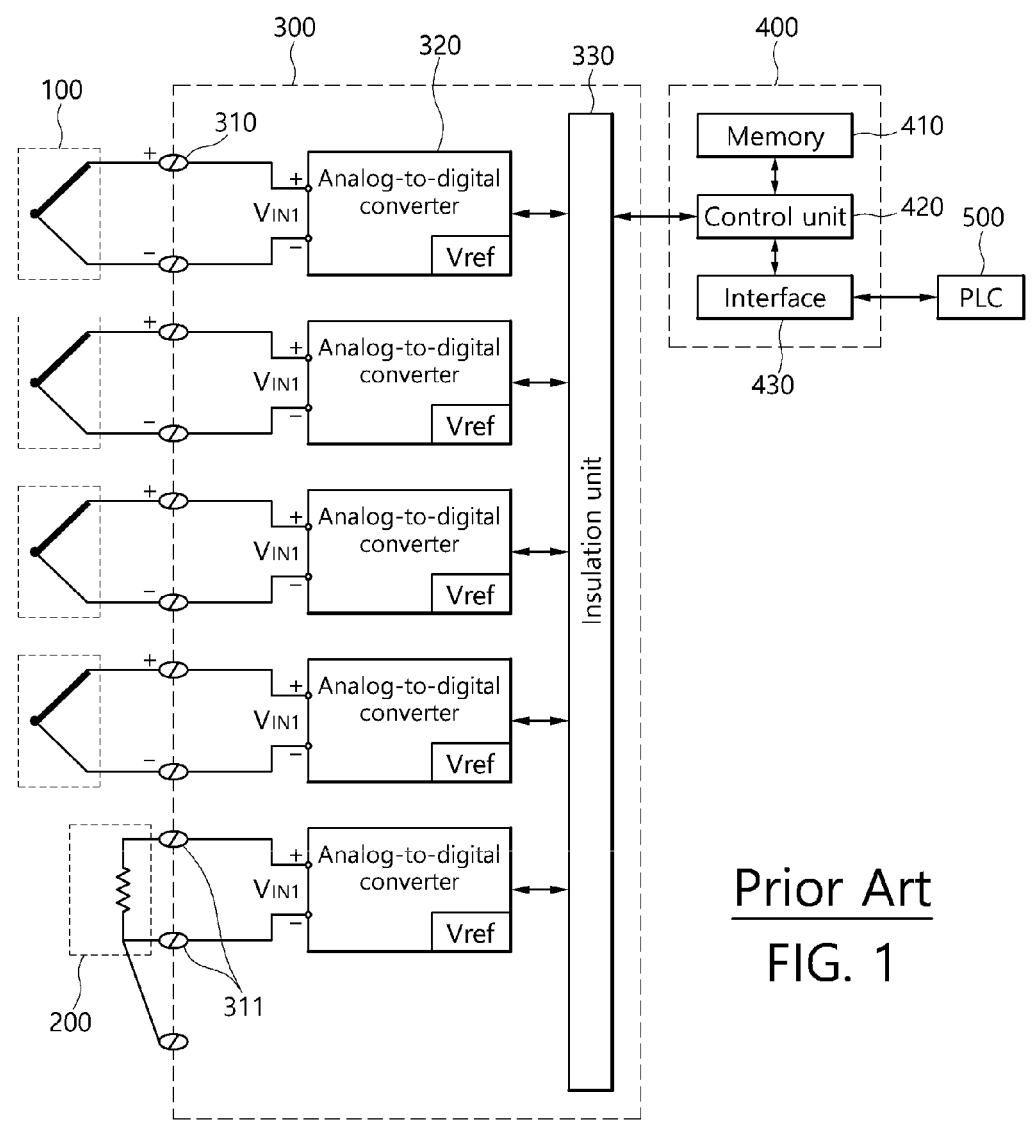
FIG. 1 is a block configuration diagram of a conventional multichannel thermocouple measurement device.

| - Explanation of Reference Numerals - |
| --- |
| 10: Thermocouple |
| 20: Thermistor |
| 21: PCB board |
| 22: Thermistor chip |
| 23: U-shaped electrode |
| 24: Printed wiring |
| 30: First detection unit |
| 33: Multichannel analog-to-digital converter |
| 40: Compensation unit |
| 60: External terminal |
| 61: First terminal |
| 62: Second terminal |

DETAILED DESCRIPTION

In order to fully understand the configurations and effects of the present disclosure, preferred exemplary embodiments of the present disclosure will be described with reference to the accompanying drawings. However, the present disclosure is not limited to the exemplary embodiments disclosed below, and may be embodied in various forms, and various modifications may be made. However, the description of the present exemplary embodiment is provided so that the disclosure of the present disclosure is complete, and to fully inform the scope of the disclosure to those of ordinary skill in the art to which the present disclosure pertains. In the accompanying drawings, components are enlarged in size from reality for the convenience of description, and the ratios of each component may be exaggerated or reduced.

Terms such as 'first' and 'second' may be used to describe various components, but the components should not be limited by the above terms. The above terms may be used only for the purpose of distinguishing one component from another. For example, without departing from the scope of the present disclosure, a 'first component' may be termed a 'second component', and similarly, a 'second component' may also be termed a 'first component'. In addition, the singular expression includes the plural expression unless the context clearly dictates otherwise. Unless otherwise defined, terms used in the exemplary embodiments of the present disclosure may be interpreted as meanings commonly known to those of ordinary skill in the art.

Hereinafter, the multichannel thermocouple measurement device according to an exemplary embodiment of the present disclosure will be described in detail with reference to the drawings.

FIG. 1 is a block diagram of a conventional multichannel thermocouple measurement device.

Referring to FIG. 1, the present disclosure is configured by including first to fourth detection units 30, 30-1, 30-2, 30-3 which are respectively connected to one thermocouple 10, 10-1, 10-2, 10-3 and one thermistor 20, 20-1, 20-2, 20-3, detect the temperature of the connected thermocouples 10, 10-1, 10-2, 10-3 and thermistors 20, 20-1, 20-2, 203, respectively, and convert the same into a digital signal, and a compensation unit 40 for compensating the cold junction temperature of the thermocouple detection temperature of the first to fourth detection units 30, 30-1, 30-2, 30-3 and providing the same to an external device 50.

The characteristic configuration and operation of the multichannel thermocouple measurement device of the present disclosure configured as described above will be described in more detail.

First, in the present disclosure, the configuration of the detection unit is divided for each channel to configure the first to fourth detection units 30, 30-1, 30-2, 30-3 for four channels.

Substantially, the first to fourth detection units 30, 30-1, 30-2, 30-3 are separated by different enclosures, thereby minimizing the occurrence of temperature deviation inside the device.

All detailed configurations of the first to fourth detection units 30, 30-1, 30-2, 30-3 may be identically configured. Therefore, in the description of the present disclosure, only the first detection unit 30 may be described as necessary, and even if there is no separate description for the second to fourth detection units 30-1, 30-2, 30-3, it may be understood that they function in the same way as the first detection unit 30.

In each of the first to fourth detection units 30, 30-1, 30-2, 30-3, one thermocouple 10, 10-1, 10-2, 10-3 is connected to junctions 31, 31-1, 31-2, 31-3, and also, one thermistor 20, 20-1, 20-2, 20-3 is connected to reference junctions 32, 32-1, 32-2, 32-3.

An amplification unit for amplifying the electromotive force of the thermocouple 10 and the electromotive force of the thermistor 20 may be provided in the first detection unit 30, and the configuration of the amplification unit is omitted in the drawings.

It is assumed that the electromotive forces of the thermocouple 10 and the thermistor 20 are analog signals, and these are respectively input to a multichannel analog-to-digital converter 33, converted into digital signals and outputted through an insulation unit 34.

The junction 31 and the reference junction 32 are disposed adjacent to each other, and it is possible to minimize the occurrence of temperature deviation therebetween.

Accordingly, each of the first to fourth detection units 30, 30-1, 30-2, 30-3 may output the temperature information which is detected by the connected thermocouples 10, 10-1, 10-2, 10-3 and the temperature information of junctions detected by the thermistors 20, 20-1, 20-2, 20-3, respectively.

The output of each of the first to fourth detection units 30, 30-1, 30-2, 30-3 is provided to one compensation unit 40.

The compensation unit 40 may include a control unit 41 for performing cold junction compensation according to a given program, a memory 42 for storing data and an interface 43 for communicating with an external device 50.

Specifically, a preset parameter of the external device 50 may be received through the interface 43 and stored in the memory 42, and the control unit 41 may perform cold junction compensation, determine signals of the first to fourth detection units 30, 30-1, 30-2, 30-3 according to the parameter, and perform control such as changing the reference value of the multichannel analog-to-digital converter 33, 33-1, 33-2, 33-3.

According to this configuration, since the present disclosure individually detects the temperature of the junctions 31, 31-1, 31-2, 31-3 of each thermocouple 10, 10-1, 10-2, 10-3, it is possible to prevent the occurrence of an error in cold junction compensation.

In addition, since the multichannel analog-to-digital converters 33, 33-1, 33-2, 33-3 are respectively applied, it is not necessary to use a digital temperature sensor to detect the temperature of the reference junctions 32, 32-1, 32-2, 32-3, and it is characterized that it is possible to detect the temperature of the reference junctions 32, 32-1, 32-2, 32-3 by using relatively inexpensive thermistors 20, 20-1, 20-2, 20-3.

Figure 3:
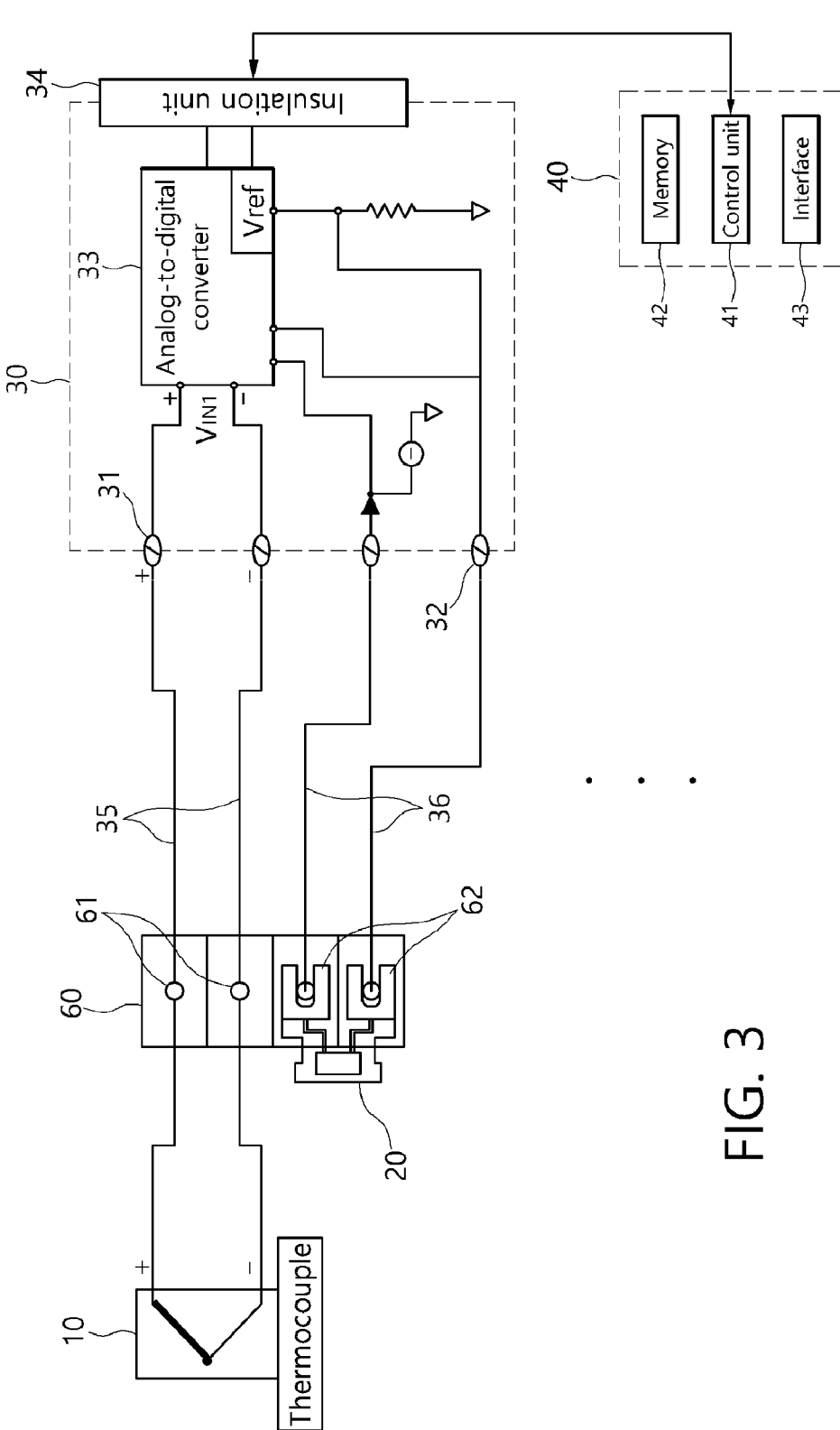
FIG. 3 is a block configuration diagram of the multichannel thermocouple measurement device according to another exemplary embodiment of the present disclosure.

FIG. 3 is a block diagram of the multichannel thermocouple measurement device according to another exemplary embodiment of the present disclosure.

Referring to FIG. 3, the temperature detection junction of the thermistor 20 may be located outside the first detection unit 30 instead of being located inside. In the drawings, the second to fourth detection units 30-1, 30-2, 30-3 are omitted.

The external terminal 60 includes a first terminal 61 to which the thermocouple 10 is connected, and a second terminal 62 to which the thermistor 20 is connected, and it is located between the thermocouple 10 and the first detection unit 30. It is assumed that the first terminal 61 and the second terminal 62 are positioned adjacent to each other.

As the external terminal 60 is located outside the first detection unit 30, no temperature deviation occurs despite the difference in positions between the first terminal 61 and the second terminal 62.

In addition, it is possible to detect a junction temperature at a position relatively close to the position of the thermocouple 10. It is known that detecting the temperature of a point where the thermocouple 10 is connected to a signal line is the most accurate way to compensate the cold junction.

Therefore, according to the present disclosure, the accuracy of cold junction compensation may be increased by positioning the external terminal 60 at a position adjacent to the thermocouple 10 and mounting the thermistor 20 at the adjacent position to detect the temperature of the external terminal 60.

In this case, the position of the external terminal 60 is assumed to be a position which is not directly affected by the temperature of a heating element, which is a temperature measurement target.

The first detection unit 30 receives the electromotive forces of the thermocouple 10 and the thermistor 20 through the external terminal 60 and the signal line, converts the same through the multichannel analog-to-digital converter 33, and transmits the same to the compensation unit through the insulation unit 34.

The multichannel analog-to-digital converter 33 may convert not only the electromotive force of the thermocouple 10 but also the electromotive force of the thermistor 20, which is the same analog signal, into digital signals.

Therefore, cold junction compensation may be performed without using a digital temperature sensor.

Figure 4:
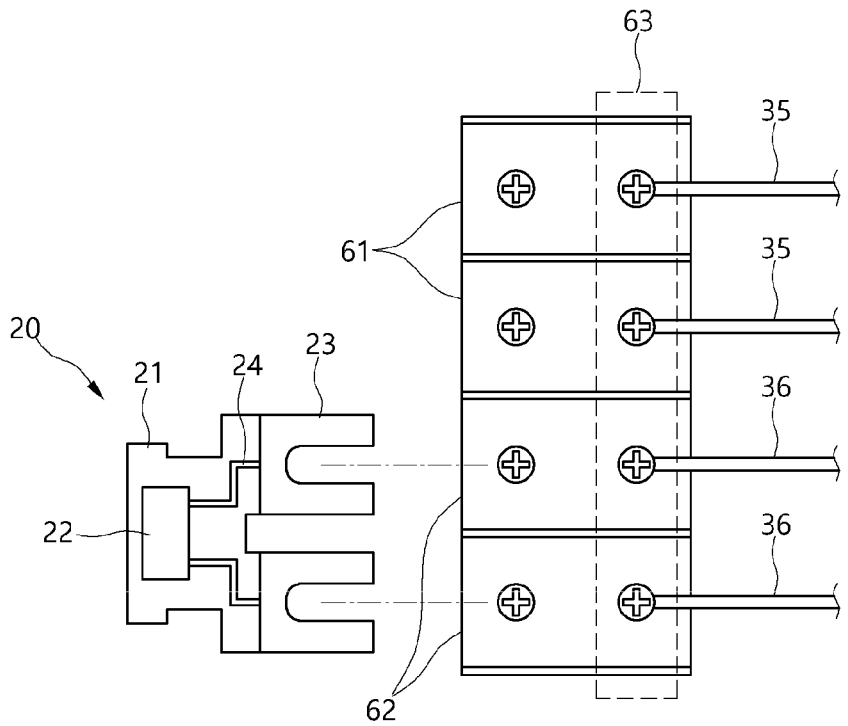
FIG. 4 is a block configuration diagram of a thermistor.

FIG. 4 is an exemplary block diagram of the external terminal 60 and the thermistor 20 coupled to the external terminal 60.

As illustrated in FIG. 4, the external terminal 60 provides four terminals such that two terminals act as a pair, and the thermocouple 10 and the thermistor 20 may be connected at the same time.

That is, as described above, it includes a first terminal 61 which is two terminals for connection of the thermocouple 10 and a second terminal 62 which is two terminals for connection of the thermistor 20.

The first terminal 61 and the second terminal 62 may use a bolt terminal type, respectively, and at least the second terminal 62 to which the thermistor 20 is connected may use a bolt terminal type.

In addition, the structure of the thermistor 20 may be provided in a form that is easily detachable from the second terminal 62.

Specifically, a pair of U-shaped terminals 23 protrude from a PCB board 21 such that they may be coupled to each terminal of the second terminal 62 of the external terminal 60.

It is assumed that a thermistor chip 22 is mounted on the PCB board 21, and the thermistor chip 22 and the U-shaped terminal 23 are electrically connected to each other by a printed wiring 24.

With such a structure, the thermistor 20 may be easily mounted or detached from the second terminal 62, and maintenance such as replacement may be facilitated as necessary.

Figure 2:
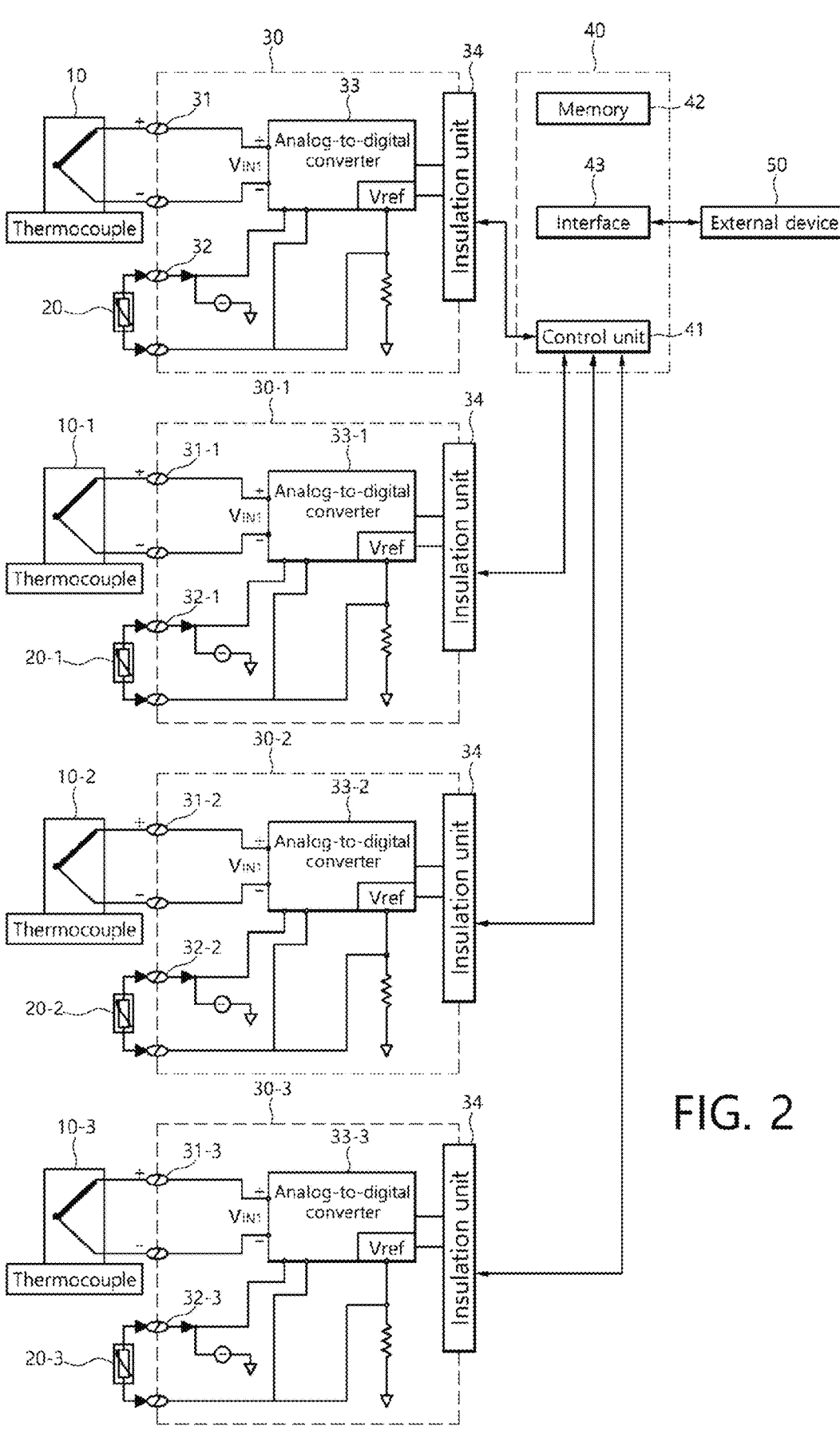
FIG. 2 is a block configuration diagram of the multichannel thermocouple measurement device according to an exemplary embodiment of the present disclosure.

In the present disclosure, although the thermistor 20 having a U-shaped terminal 23 is illustrated and described as being coupled to the second terminal 62 of the external terminal 60, it is certain that it may also be used for coupling with the reference junction 32 in the configuration of FIG. 2.

Each of the first terminal 61 and the second terminal 62 of the external terminal 60 includes a signal line connection terminal 63 in which a first signal line 35 for detecting the electromotive force of the thermocouple 10 and a second signal line 36 for detecting the electromotive force of the thermistor 20 are connected.

As described above, since the present disclosure uses a multichannel analog-to-digital converter to convert the temperature detection results of the thermocouple 10 and the thermistor 20 into digital signals, the thermocouple detection and cold junction compensation may be performed without using a digital temperature sensor.

In addition, it is characterized in that more accurate cold junction compensation is possible by using the external terminal 60, and cold junction compensation is possible without preheating by preventing the occurrence of temperature deviation.

Although the exemplary embodiments according to the present disclosure have been described above, these are merely exemplary, and those of ordinary skill in the art will understand that various modifications and equivalent ranges of the exemplary embodiments are possible therefrom. Accordingly, the true technical protection scope of the present disclosure must be defined by the following claims.

Since the present disclosure relates to a technique for preventing the occurrence of an error in the cold junction compensation of a thermocouple by using the laws of nature, it has industrial applicability.

The invention claimed is:

1. A multichannel thermocouple measurement device comprising:

a thermocouple-thermistor pair;

a terminal to which an analog signal of the thermocouple-thermistor pair is input, wherein the analog signal is of either a thermocouple or a thermistor belonging to the thermocouple-thermistor pair;

a detection unit which comprises a multichannel analog-to-digital converter and converts the analog signal of the thermocouple-thermistor pair, which is input via the terminal, into a digital signal in the multichannel analog-to-digital converter; and a compensation unit for performing cold junction compensation of the thermocouple by receiving the digital signal of the detection unit, wherein the detection unit is provided in plurality, the plurality of the detection units are separately housed, and the terminal is an external terminal which is located outside of each of the detection unit, wherein the thermistor comprises a PCB board on which a thermistor chip is mounted, a pair of U-shaped terminals which protrude from the PCB board, and a printed wiring which electrically connects each U-shaped terminal and the thermistor chip so as to be detachably coupled to the terminal, and wherein the external terminal is composed of four terminals, with two terminals acting as a pair, such that the thermocouple and the thermistor can be connected simultaneously.

\* \* \* \* \*